United States Patent Office 3,295,918
Patented Jan. 3, 1967

3,295,918
METHOD OF TREATING EXHAUST GASES
Warren S. Briggs, Silver Spring, William A. Stover, Ellicott City, and John L. Warthen, Baltimore, Md., assignors to W. R. Grace & Co., Clarksville, Md., a corporation of Connecticut
No Drawing. Filed Sept. 6, 1962, Ser. No. 221,895
3 Claims. (Cl. 23—2)

This invention relates to a catalytic system for internal combustion engines. In one particular embodiment, it relates to a catalyst system with exceptional hydrocarbon conversion properties and improved resistance to disintegration of the catalysts in the presence of lead compounds.

The problem of air pollution is not a new one. However, the problem has become aggravated in many cities in recent years. The air in most cities contains substantial quantities of both oxides of nitrogen and the products of incomplete combustion of organic fuels. In the presence of sunlight, photolysis of the oxides of nitrogen leads to the formation of measurable quantities of ozone. The ozone, in turn, reacts with various organic pollutants to form compounds which can cause the many undesirable manifestations of smog, such as eye irritation, visibility reduction and plant damage.

When meteorological conditions prevent the rapid dispersion of pollutants, a smog condition results. Furthermore, it is now known that in many cities a major portion of organic pollutants are derived from unburned or partially burned hydrocarbons in the exhaust of internal combustion engines.

Another pollutant of much concern is carbon monoxide which is undesirable because of its toxic nature. This, too, is derived mainly from exhaust emissions.

Almost since the advent of the automobile attempts have been made to solve the problem by rendering harmless and unobjectionable the noxious fumes which are the by-products of internal combustion engines. Various devices and filters using elementary catalytic materials, and from the 1920's on, various modifications of filters and mufflers, have been designed in an attempt to solve this problem. To date, none have met with success complete enough for practical application. One of the most difficult problems to overcome is the fact that although a given purification system appears to work initially, within a short period of time it becomes thoroughly contaminated and consequently useless.

It does not seem feasible to install catalytic systems which must be periodically removed and rejuvenated because of the cost of such a system and such treatment.

Several investigators have realized that the only practical way to treat exhaust fumes to reduce hydrocarbon and carbon monoxide pollution is to oxidize the hydrocarbons to carbon dioxide and water and to oxidize the carbon monoxide to carbon dioxide.

A wide selection of oxidation catalysts have been produced in the past, varying both in chemical composition and physical structure. With respect to chemical composition, the ability of a wide variety of metals and metal oxides, either alone or in combination, to catalyze the complete oxidation of hydrocarbons has been noted.

To be sufficiently effiicent for the removal of hydrocarbons and carbon monoxide from auto exhaust gases and to meet the standards of maximum emissions currently under consideration in the legislatures of the various States, a catalyst for treating exhaust gases must become efficient within a very few minutes after engine start-up and must maintain its activity throughout the various modes of engine operation. A catalytic converter must maintain its activity for a period of not less than one year and preferably for two years or 20,000 miles of engine operation.

The problem of excessively high temperatures which are obtained when concentrations of pollutants are being oxidized must also be solved in this system. It is not unusual for catalytic temperatures to reach 1600° F. or higher. A normal catalytic system cannot withstand prolonged exposure to these temperatures without thermal degradation of the catalyst.

The problem of conversion of carbon monoxide and hydrocarbons at the low temperatures obtained in a catalytic muffler system at the start-up period of engine operation is also particularly troublesome. A catalyst must be active enough initially to be acceptable for use in an auto exhaust catalyst system. It is not sufficient that a catalyst will have a good activity after the engine is warmed up and the catalyst bed is at a temperature high enough to cause exhaust vapors passing through the bed to be oxidized to carbon dioxide and water.

The catalytic systems which have been devised to give satisfactory results for carbon monoxide conversion frequently suffer from relatively poor conversion of hydrocarbons. Since the ideal catalytic system gives a good conversion of both of the exhaust gas components, this problem is of prime importance.

An additional difficulty in the preparation of auto exhaust catalysts and the design of a suitable muffler for the integration of the exhaust catalyst into the conversion system is the problem caused by the presence of lead compounds in the exhaust, such as oxides of lead and particles of metallic lead, etc. This lead results from the conversion of tetraethyl lead which is still the most commonly used gasoline anti-knock additive. In the preparation of gasolines, a quantity of tetraethyl lead is added to the gasoline at the refinery to impart anti-knock properties to the fuel. In addition to the tetraethyl lead, various compounds such as ethylene bromide and ethylene chloride, for example, are added, which convert the lead to volatile compounds which have an appreciable vapor pressure and are thus carried out of the engine into the exhaust system. The presence of these compounds causes problems with catalytic systems in that these lead salts, in addition to the physical coating of the individual catalyst particles, cause deterioration and breakdown of these particles.

We have found that an auto exhaust catalyst with excellent hydrocarbon conversion and carbon monoxide conversion activity and good resistance to the lead present in the auto exhaust can be prepared to contain 2 to 12% copper oxide (CuO), 0.0025 to 0.4% palladium (Pd), 2 to 18% manganese dioxide ($MnO_2$), and 1 to 20% chromia ($Cr_2O_3$).

The use of palladium in these catalyst preparations definitely has a promotional effect. The palladium improves the cold-start activity of these catalysts. Not only is the hydrocarbon conversion exceptional for the catalysts of this composition, but the high temperature stability is excellent.

Broadly speaking, the process of preparing the catalyst of our invention consists of selecting a suitable base and impregnating the base with a solution prepared by mixing a soluble chromia compound with water and mixing this solution with a manganese compound. The mixture is stirred and additional manganese salt is added if necessary to adjust the $Cr_2O_3$–$MnO_2$ ratio. This solution is mixed with a copper salt-palladium salt solution to give the proper ratios of CuO–$MnO_2$–$Cr_2O_3$–Pd.

After the impregnation, the catalyst is dried for a short period of time at about 120–260° F. Reimpregnation may be required to give the desired metal level and if necessary, the catalyst is redried at a temperature of 120–260° F. for 4 to 48 hours. The final step in the catalyst preparation is calcination from 1 to 3 hours at 1400° F.

The first step in the preparation of the catalyst is the selection of a suitable base. The base or support for the catalyst should have a high surface area and be a relatively porous material in order that maximum activity will be exhibited by the catalytic components. The supports should also have good physical properties to avoid the problem of excessive attrition. Examples of suitable supports include alumina, silica-alumina, silica-magnesia, zirconia, zirconia-alumina, zirconia-magnesia, etc.

Particularly good results are obtained in using a gamma-type alumina as the catalyst support. This support may be used in a powder, granulated, pilled or extruded form. A particularly desirable support is the gamma-type alumina which is commercially available in the form of nodules. These nodules have a very desirable combination of properties. The crushing strength is quite high. They are porous and have a high surface area.

The size of the nodules has some bearing on the activity of the catalyst. The preferred size of these nodules is about 5 to 8 mesh (the Tyler standard screen scale). However, satisfactory results have been obtained when the nodules are in the range of about 3 to 10 mesh (the Tyler standard screen scale).

After the support has been selected it is impregnated with a copper salt-palladium salt-manganese salt-chrome salt solution. The copper salts and palladium salts are present in an amount sufficient to impregnate the final catalyst with up to about 12% copper oxide and about 0.0025 to 0.4 weight percent palladium. Any of the known copper salts can be used in preparing these catalysts. Such salts include, for example, copper bromide, copper chloride, copper cyanide, copper fluoride, copper thiocyanate, etc. Because of its availability and comparatively low cost, the preferred copper salt is the nitrate $(Cu(NO_3)_2)$.

After the copper salt solution has been prepared, a solution of a palladium salt is added. Suitable palladium salts include palladium bromide, palladium chloride, palladium nitrate, palladium sulfate, etc. The preferred salt is the palladium nitrate.

This solution is then mixed with the solution containing the chromium and manganese constituents. Suitable chrome salts for use in the preparation of this solution include ammonium chromate, chromic acid, ammonium dichromate and chromic acetate. The manganese salts are then added to this solution. Suitable manganese salts include manganese carbonate, manganese hydroxide, manganese iodide, manganese oxalate, manganese fluoride, manganese dichloride, manganese nitrate, etc.

The preferred method of preparing this impregnation solution is to dissolve the desired amount of chromium trioxide in water. This forms a solution of chromic acid which is then mixed with the manganese carbonate powder. The mixture is stirred until the evolution of carbon dioxide stops and the solution is then used in the subsequent steps. The manganese-chromium ratio is adjusted if needed, by the addition of manganese nitrate.

After this mixed solution containing chromium, manganese, copper and palladium salts is prepared, it is used to impregnate the base. The amount of aqueous impregnation solution used in this stage of the preparation is not critical. Suitable impregnation can generally be made by using about 40 to 50 ml. of impregnating solution per 100 grams of catalyst base.

The impregnating solution should contain sufficient copper, palladium, manganese and chromium to deposit up to 12 weight percent CuO, 0.4 weight percent Pd, 18 weight percent $MnO_2$ and 20 weight percent $Cr_2O_3$ on the catalyst base.

After the impregnation step is complete, the impregnated material is dried in the presence of steam, air or mixtures of air and steam at a temperature of about 120 to 260° F.

After the catalyst is dried in this manner, it is reimpregnated if desired, to increase the metal oxide content. The catalyst is then redried at 120 to 260° F. for a period of 4 to 48 hours and calcined for 1 to 3 hours at 1400° F.

The attrition resistance of the catalyst particles was determined in a test which utilizes an air jet stream to transfer individual granules against the wall of the containing vessel at relatively constant velocity and hence energy of impact. The impact causes slow degradation of the particles, the rate depending upon the attrition properties of the particular catalyst.

The specific method of determining the attrition of 5 to 8 mesh particles is as follows:

A sample of exactly 10 grams is placed in a one liter Erlenmeyer flask with a one inch diameter opening cut through the bottom which opening is covered with a screen. An inverted brass funnel with a mouth size about the same size as the internal diameter of the neck of the flask is inserted in the mouth of the flask through a rubber stopper. A constant known air source of approximately 7.7 standard ft.$^3$/min. is directed into the funnel. With the Erlenmeyer flask in an inverted position and the sample resting on the screen over the funnel, the air jet causes the granules to be bombarded against the top and sides of the flask. The superficial linear velocity of the air at the funnel stem is in excess of 400 ft./sec. As the particles attrite, dust from the attrition is carried away by vacuum. A ten gram sample of 5 to 8 mesh catalyst particles contains about 800 granules so that the sample is representative.

The air rate into the flask is kept constant by holding the pressure of the supply at 38 lb./in.$^2$. The attrition is carried on for a period of thirty minutes. After the test is completed, the sample is screened through a 12 mesh screen. The percentage attrition is defined as the percentage of material not retained on a 12 mesh screen. The mesh of the screen is varied in determining the attrition of smaller and larger particles.

The activity index of the catalyst for either carbon monoxide or hydrocarbon conversion is determined by measuring the area under an activity curve in the range of the average catalyst temperatures of 350–850° F., and calculating what percentage this area constitutes of the area under the "ideal" activity curve. "Ideal" activity is defined as 100% conversion throughout this temperature range. Thus the activity index may vary from 0 which indicates no activity to 100% which would indicate so-called "ideal" activity.

The invention is further illustrated by the following specific but non-limiting examples.

EXAMPLE I

A general method of preparing the catalyst of our invention is as follows:

The impregnating solutions were prepared from commercially available chemicals. The chrome-manganese solution was made up by dissolving 250 grams of $CrO_3$ in 420 ml. of water. A total of 148 grams of $MnCO_3$ was then added to the solution. The total solution volume was 600 ml. This solution contained an equivalent of 0.317 gram of $Cr_2O_3$ and 0.187 gram of $MnO_2$ per ml. The copper and palladium components were added to the solution by weighing 36.4 grams of copper nitrate $(Cu(NO_3)_2 \cdot 3H_2O)$ and dissolving the salt in 96.5 ml. of the chrome-manganese solution.

A total of 0.6 ml. of a palladium nitrate solution containing 0.1 gram of palladium per ml. was added to this mixture. In preparing the catalyst, 260 grams (240 grams dry basis) of nodules of commercial gamma type alumina was contacted with the solution prepared as described above. Sufficient solution was added to saturate the nodules but leave the surfaces essentially dry. The impregnated base was then dried at 260° F. The support was reimpregnated and finally dried for 16 hours at 260° F. The dry nodules were calcined for 3 hours at 1400° F. At this point the impregnated base contained 4% by weight CuO, 6% by weight $MnO_2$, 10.2% by weight $Cr_2O_3$ and 0.02% by weight Pd.

EXAMPLE II

An alternate method of preparing the catalyst of our invention was evaluated and found to give satisfactory results.

In this process, the nodules were impregnated first with a chrome solution and subsequently reimpregnated with a solution of manganese, copper and palladium.

A total of 250 grams ($Al_2O_3$ basis) of nodules of alpha-alumina monohydrate were weighed out and impregnated with a solution of 24.8 grams of ammonium dichromate [$(NH_4)_2Cr_2O_7$] in enough distilled water to bring the mass to incipient wetness. After the impregnation, the nodules were dried at 260° F. and reimpregnated with a portion of a solution containing 62 grams of manganese nitrate [$Mn(NO_3)_2$], 45.7 grams of copper nitrate [$Cu(NO_3)_2 \cdot 3H_2O$], and 0.6 ml. of palladium nitrate (10%). The nodules were dried at 260° F. and reimpregnated with the remainder of the above solution. After reimpregnation, the nodules were dried at 260° F. and calcined for 3 hours at 1400° F. The final catalyst contained 5 weight percent $Cr_2O_3$, 5 weight percent CuO, 10 weight percent $MnO_2$ and 0.02 weight percent Pd.

EXAMPLE III

The improvement in thermal stability of these catalysts was evaluated in a run in which catalysts were impregnated to contain 5 and 10 percent $Cr_2O_3$, 5% CuO, 10% $MnO_2$ and 0.02% Pd and the activity compared after calcining for 3 hours at 1400° F., and after an additional 16 hours at 1400° F. The catalysts were prepared according to the technique described in Example II.

The activity data was then collected for each of these samples and compared. In addition to the activity index, which was determined using the method described previously, these catalysts were evaluated by determining the percent conversion of a mixture containing 3.85% carbon monoxide, 100 parts per million of normal hexane, 10% water and 4.5 oxygen, the balance being nitrogen.

The gases were passed through the catalyst maintained at predetermined temperatures at a gaseous hourly space velocity of 5000 volumes of gas per volume of catalyst per hour. The data collected in this series of runs is set out in Table I below.

*Table I*

| Wt. percent $Cr_2O_3$ | 5 | 5 | 10 | 10 |
|---|---|---|---|---|
| Conversions as a Function of Average Catalyst Temperature: | | | | |
| Carbon monoxide at 450° F | 73 | 70 | 68 | 54 |
| Hydrocarbon at 650° F | 85 | 84 | 76 | 85 |
| Hydrocarbon at 750° F | 97 | 97 | 94 | 98 |
| Calcination time at 1,400° F | 3 | 19 | 3 | 19 |
| Activity Indices: | | | | |
| Carbon monoxide | 87.7 | 85.8 | 85.5 | 80.9 |
| Hydrocarbon | 56.5 | 57.0 | 52.3 | 55.6 |

It is apparent from comparison of the activity indices of the catalysts containing 5 and 10% $Cr_2O_3$ that there is no appreciable loss in activity when the catalyst is heated for an additional 16 hours at 1400° F. The activity indices for the catalyst containing 5% $Cr_2O_3$ are essentially the same after 3 and 19 hours calcination at 1400° F., although there is a slight decrease in the carbon monoxide activity when the catalyst containing 10% $Cr_2O_3$ is calcined for 19 hours at 1400° F. This is compensated by a slight improvement in the hydrocarbon activity. The excellent hydrocarbon conversion properties of these catalysts are shown by the hydrocarbon conversion at 750° F. At least 94% of the hydrocarbon was converted at this temperature in the presence of the catalyst.

EXAMPLE IV

The stability of the catalysts containing varying amounts of CuO, $MnO_2$ and $Cr_2O_3$ was evaluated in a series of runs in which the activity indices of the catalysts were determined after calcination for 3 and 9 hours at 1400° F. The stability of a catalyst containing 10% CuO, 2.3% $MnO_2$ and 4% $Cr_2O_3$ was determined and compared with a catalyst containing 4% CuO, 6% $MnO_2$ and 10.2% $Cr_2O_3$. The catalysts were prepared using the technique described in Example I in which the amount of copper nitrate necessary to add the desired percentage of copper to the catalyst was added to a chrome-manganese solution. A quantity of sorbitol equal to 3% of the weight of the base was added along with sufficient $Pd(NO_3)_2$ to provide a total of 0.02% Pd in the final catalyst. The catalyst was prepared using 300 gram portions of 6 to 8 mesh (Tyler standard screen scale) gamma type alumina nodules. The nodules were impregnated by the double impregnation technique, dried at 260° F. and calcined for 3 hours at 1400° F. A portion of the calcined catalyst was separated from the main batch and calcined for an additional 16 hours at 1400° F. The carbon monoxide and hydrocarbon conversions at various average catalyst temperatures were determined using the technique described in Example III. The activity indices were determined using the techniques described previously. The data collected in this series of runs is set out in Table II below.

*Table II*

| Catalyst Composition in percent: | | | | |
|---|---|---|---|---|
| CuO | 10.0 | 10.0 | 4.0 | 4.0 |
| $MnO_2$ | 2.3 | 2.3 | 6.0 | 6.0 |
| $Cr_2O_3$ | 4.0 | 4.0 | 10.2 | 10.2 |
| Pd | 0.02 | 0.02 | 0.02 | 0.02 |
| Calcination Time, Hours at 1,400° F | 3 | 19 | 3 | 19 |
| Conversions as a Function of Average Catalyst Temperature: | | | | |
| Carbon monoxide at 450° F | 67 | 53 | 50 | 53 |
| Hydrocarbon at 650° F | 83 | 75 | 52 | 69 |
| Hydrocarbon at 750° F | 97 | 97 | 87 | 93 |
| Activity Indices: | | | | |
| Carbon monoxide | 86 | 79.8 | 78.4 | 79.5 |
| Hydrocarbon | 50.9 | 48.0 | 42.4 | 47.5 |

The excellent hydrocarbon conversion of these catalysts is apparent from the hydrocarbon activity at 750° F. The carbon monoxide activity is of a suitably high level. The comparison of columns 1 and 2 and 3 and 4 shows that there was no extensive loss of activity in the catalyst after it had been calcined for 19 hours at 1400° F. In the catalyst containing 10.2% chromia, the activity indices were actually improved by the protracted treatment at high temperatures. It is obvious that a catalyst with excellent hydrocarbon conversion and excellent high temperature stability can be prepared using various percentages of the components.

EXAMPLE V

The magnitude of the improvement in heat stability and hydrocarbon conversion of the catalyst was determined by comparing a catalyst impregnated to contain 4% CuO, 4% $Cr_2O_3$, 6% $MnO_2$ and 0.02% Pd with a catalyst containing 10% CuO, 0.02% Pd and 4% $Cr_2O_3$ and a catalyst which contained 8% CuO, 0.02% Pd and 12% manganese.

The comparison was made using the technique described previously. One portion of each of these catalysts was calcined for 3 hours at 1400° F. Another portion was calcined for an additional 16 hours at 1400° F. The comparison of the losses of activity of the catalysts on calcination for an additional 16 hours at 1400° F. gives an excellent compartive evaluation of the heat stability of the catalysts. The activity indices of the catalyst for carbon monoxide and hydrocarbon showed the comparative activity of the catalyst for conversion of these components.

The data collected in this series of runs is shown in Table III below.

*Table III*

| Catalyst Composition in percent: | | | | | | |
|---|---|---|---|---|---|---|
| CuO | 4 | 4 | 10 | 10 | 8 | 8 |
| $MnO_2$ | 6 | 6 | None | None | 12 | 12 |
| Pd | 0.02 | 0.02 | 0.02 | 0.02 | 0.02 | 0.02 |
| $Cr_2O_3$ | 4 | 4 | 4 | 4 | None | None |
| Calcination time, Hours at 1,400° F | 3 | 19 | 3 | 19 | 3 | 19 |
| Activity Indices: | | | | | | |
| Carbon monoxide | 92.3 | 91.4 | 97.1 | 82.7 | 93.2 | 83.2 |
| Hydrocarbon | 65.5 | 59.3 | 36.5 | 41.8 | 53.7 | 43.4 |

These data show clearly that the catalyst prepared to contain CuO, $MnO_2$, Pd and $Cr_2O_3$ is more stable than the catalysts prepared without either $MnO_2$ or $Cr_2O_3$. The loss of activity on calcination at 1400° F. for 19 hours was greatest in the catalyst that contained no $Cr_2O_3$. However, the catalyst that contained no $MnO_2$ lost a substantial amount of carbon monoxide conversion activity after the high temperature treatment.

EXAMPLE VI

The superior performance of the novel catalyst of our invention was shown by comparing the performance of the catalysts prepared by the methods described in Examples I and II with an auto exhaust catalyst which contained 10 weight percent copper oxide (CuO), 0.02 weight percent palladium and 5 weight percent chromia ($Cr_2O_3$).

In this series of runs the catalysts were evaluated in a muffler system in which the exhaust gases passed from the top to the bottom of the system. The catalysts were subjected to actual operating conditions for periods of 93 to 100 hours by placing the catalysts on screens in the two beds of the muffler, where one catalyst is above the other. The exhaust stream of a single cylinder engine and auxiliary air was passed through the catalyst beds.

The engine was operated on a commercial premium gasoline containing 3.0 ml. of tetraethyl lead per gallon. The engine, in this test, was a Palmer PW-27 water-cooled single cylinder engine with a bore of 3.25 inches and a displacement of 27 cubic inches. The engine was automatically controlled to operate on a repetitive two minute cycle consisting of approximately 30 seconds at idle (500 r.p.m.) and 90 seconds at cruise (1800 r.p.m.). A total of 660 ccs. of catalyst was placed in the muffler which had a diameter of 3 inches. The muffler was inserted in the exhaust line in such a manner that it acted as a downflow reactor. Thermocouples were placed at various points through the catalyst beds of the muffler. The amount of carbon monoxide being passed through the muffler was varied by adjusting the carburetor to maintain the maximum catalyst temperature between 1400 and 1450° F. Excess air was added to insure complete combustion, that is, about 0.3 to 1.2 s.c.f.m. The engine was operated for 93 to 100 hours at a temperature of 1400–1450° F. After 93 to 100 hours, the catalysts were removed from each of the beds and the activity of the catalyst for hydrocarbon and carbon monoxide conversion was determined as previously described in Example III.

The evaluations of the catalysts were made on the basis of the activity of the catalysts for hydrocarbon and carbon monoxide conversion before and after 93 to 100 hours in the muffler of the single cylinder engine. The comparative data was collected using the catalyst of this invention which was prepared to contain 4% CuO, 6% $MnO_2$, 4% $Cr_2O_3$ and 0.02% Pd (designated Catalyst A), and a palladium promoted copper oxide catalyst which was protected by a chromia ring (designated Catalyst B). This catalyst contained 10% copper oxide, 0.02% Pd, and 4% chromia as $Cr_2O_3$. This data is set out in Table IV below.

*Table IV*

| Catalyst | Activity Indices | | | |
|---|---|---|---|---|
| | Fresh | | After 93 to 100 hours in the muffler | |
| | CO | Hydrocarbon | CO | Hydrocarbon |
| A | 87.8 | 60.7 | First Bed 73.7 | 36.5 |
| | | | Second Bed 70.5 | 46.2 |
| B | 97.4 | 37.7 | First Bed 56.1 | 15.3 |
| | | | Second Bed 65.4 | 23.7 |

The superior lead resistance of the catalyst prepared according to the process of this invention is shown by comparison of the hydrocarbon activity of the catalysts removed from the first bed after 93 to 100 hours in the muffler. The catalyst prepared according to the process of this invention retains considerable activity after 100 hours exposure to lead under operating conditions. Catalyst B had lost a higher percentage of its activity for hydrocarbon conversion after this treatment. The conversion in the second bed where the exposure to lead is not as severe is, of course, improved. These data clearly show that the catalyst prepared according to the process of the instant invention has excellent resistance to the deleterious effects of the lead salts found in the exhausts of internal combustion engines.

Obviously many modifications and variations of the invention, as herein above set forth, may be made without departing from the essence and scope thereof, and only such limitations should be applied, as indicated in the appended claims.

What is claimed is:

1. A method for treating exhaust gases of internal combustion engines to oxidize the pollutants therein which comprises mixing an oxygen containing gas with said exhaust gases and passing said mixture through a bed of a catalyst comprising 2 to 12 weight percent copper oxide, 2 to 18 weight percent manganese dioxide, 1 to 20 weight percent chromic oxide and about 0.0025 to 0.4 weight percent palladium, impregnated on a porous, high surface area base, and passing the thus treated gases to the atmosphere.

2. A method of treating exhaust gases of internal combustion engines to oxidize the air pollutants therein which comprises mixing said exhaust gases with air, passing the mixture through a catalyst bed consisting of 2 to 12 weight percent copper oxide, 2 to 18 weight percent manganese dioxide, 1 to 20 weight percent chromic oxide and about 0.0025 to 0.4 weight percent palladium on a gamma type alumina base in nodular form, and passing the thus treated gases to the atmosphere.

3. A method of treating exhaust gases of internal combustion engines to oxidize the air pollutants therein which comprises mixing said exhaust gases with air, passing the mixture through a catalyst bed consisting of 2 to 10 weight percent copper oxide, 2 to 10 weight percent manganese dioxide, about 1 to 10 weight percent chromic oxide and about 0.01 to 0.1 weight percent palladium impregnated on a gamma type alumina base in nodular form and passing the said treated gases to the atmosphere.

References Cited by the Examiner

UNITED STATES PATENTS

| 2,759,899 | 8/1956 | Hanson | 252—450 |
| 2,942,932 | 6/1960 | Elliott | 23—2 |
| 2,945,823 | 7/1960 | Cornelius et al. | 252—450 |
| 3,025,132 | 3/1962 | Innes | 23—2 |
| 3,133,029 | 5/1964 | Hoekstra | 23—2 X |

OSCAR R. VERTIZ, *Primary Examiner.*

MAURICE A. BRINDISI, EARL C. THOMAS,
*Examiners.*